(12) United States Patent
Agen et al.

(10) Patent No.: US 11,160,341 B2
(45) Date of Patent: Nov. 2, 2021

(54) FRAME TO REMOVABLY ATTACH BAGS

(71) Applicant: HEWLETT-PACKARD DEVELOPMENT COMPANY, L.P., Houston, TX (US)

(72) Inventors: Tara J. Agen, San Diego, CA (US); Ramona K. Schodin, San Diego, CA (US); Dustin Hoffman, Houston, TX (US); Glenn A. Wong, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 439 days.

(21) Appl. No.: 16/098,122

(22) PCT Filed: Jun. 27, 2016

(86) PCT No.: PCT/US2016/039650
§ 371 (c)(1),
(2) Date: Oct. 31, 2018

(87) PCT Pub. No.: WO2018/004522
PCT Pub. Date: Jan. 4, 2018

(65) Prior Publication Data
US 2019/0142122 A1    May 16, 2019

(51) Int. Cl.
*A45C 7/00* (2006.01)
*A45C 5/03* (2006.01)
*A45C 5/14* (2006.01)
*A45C 13/04* (2006.01)
*A45C 13/26* (2006.01)

(52) U.S. Cl.
CPC .............. *A45C 7/0031* (2013.01); *A45C 5/03* (2013.01); *A45C 5/14* (2013.01); *A45C 7/0045* (2013.01); *A45C 13/04* (2013.01); *A45C 13/262* (2013.01); *A45C 2013/267* (2013.01)

(58) Field of Classification Search
CPC ........... A45C 7/0031; A45C 5/03; A45C 5/14; A45C 7/0045; A45C 13/04; A45C 13/262; A45C 2013/267
See application file for complete search history.

(56) References Cited

U.S. PATENT DOCUMENTS 3,400,942 A * 9/1968 Hull ...................... B62B 5/0083
                                                            280/39
3,879,798 A    4/1975 Krulwich
(Continued)

FOREIGN PATENT DOCUMENTS

EP          187318 A1 *  7/1986
JP          H06 8142 U   11/1991

*Primary Examiner* — Tri M Mai
(74) *Attorney, Agent, or Firm* — Amin Turocy & Watson LLP

(57) ABSTRACT

Example implementations relate to a frame to removably attach bags. For example, an apparatus includes a frame, at least one frame wheel connected to the frame, and an extender device attachable to the frame. The extender device includes a platform, at least one platform wheel connected to the platform, and a first extender connector device on the platform to removably attach the platform to the frame and to removably attach the platform to a first bag of a first size. The apparatus also includes a frame connector device on the frame to removably attach the first bag to the frame.

15 Claims, 3 Drawing Sheets

(56) References Cited

U.S. PATENT DOCUMENTS

| | | | | |
|---|---|---|---|---|
| 3,947,054 A | * | 3/1976 | Hall | B62B 1/12 |
| | | | | 280/645 |
| 4,717,168 A | * | 1/1988 | Moon, Sr. | B62B 3/02 |
| | | | | 188/19 |
| 5,207,440 A | | 5/1993 | Liang | |
| 5,323,886 A | | 6/1994 | Chen | |
| 5,348,325 A | * | 9/1994 | Abrams | B62B 1/12 |
| | | | | 280/40 |
| 5,529,322 A | * | 6/1996 | Barton | A45C 5/14 |
| | | | | 108/147.11 |
| 5,676,223 A | | 10/1997 | Cunningham | |
| 7,014,020 B2 | * | 3/2006 | Tamura | A45C 5/14 |
| | | | | 190/1 |
| 7,222,705 B1 | * | 5/2007 | Guza | A45C 15/00 |
| | | | | 190/1 |
| 10,076,167 B2 | * | 9/2018 | Kim | A45C 7/0045 |
| 10,568,402 B2 | * | 2/2020 | Kim | A45C 5/146 |
| 2002/0148693 A1 | | 10/2002 | Bauer | |
| 2004/0238303 A1 | * | 12/2004 | Hafif | A45C 5/143 |
| | | | | 190/18 A |
| 2006/0119057 A1 | | 6/2006 | Russo | |
| 2008/0217130 A1 | | 9/2008 | Louis | |
| 2010/0263977 A1 | | 10/2010 | Wu | |
| 2010/0276242 A1 | | 11/2010 | Yang | |
| 2011/0168507 A1 | | 7/2011 | Penley et al. | |
| 2012/0161408 A1 | | 6/2012 | Sidhu | |
| 2015/0158516 A1 | | 6/2015 | Chen et al. | |
| 2016/0045000 A1 | | 2/2016 | Green | |

* cited by examiner

FRAME TO REMOVABLY ATTACH BAGS

BACKGROUND

Business professionals who travel often carry several pieces of luggage to accommodate their needs. For example, a business professional might carry a bag for their computing devices as well as a bag for their clothes, shoes, and other personal items.

BRIEF DESCRIPTION OF THE DRAWINGS

Some examples of the present application are described with respect to the following figures.

DETAILED DESCRIPTION

As described above, business professionals who travel often carry several pieces of luggage to accommodate their needs. Carrying multiple pieces of luggage can be difficult for an individual to manage. As such, examples discussed herein may provide a frame to removably attach multiple bags. The frame may be part of a modular travel system that allows multiple bags of various sizes to be removably attached to the frame.

Figure 1:
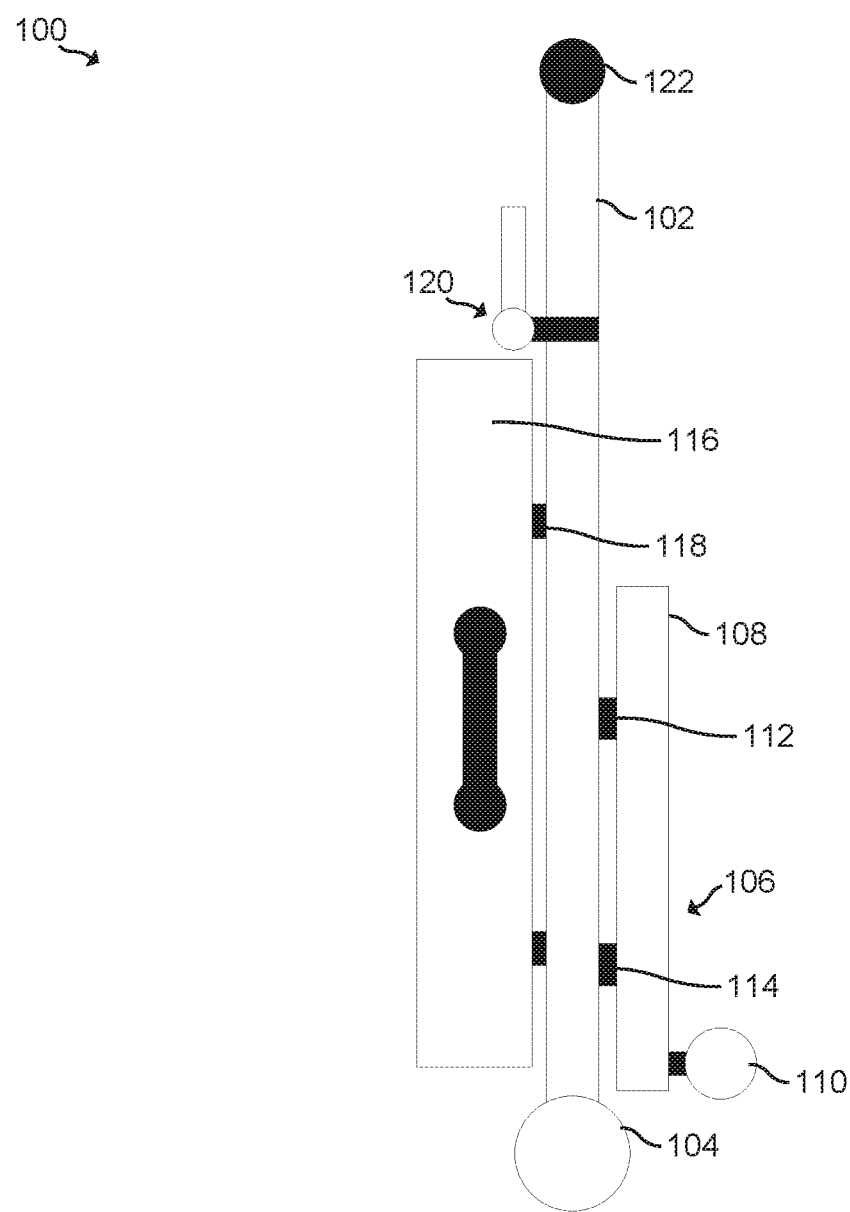
FIG. 1 illustrates an example apparatus having a frame to allow a bag to be removably attached.

Referring now to the figures, FIG. 1 illustrates an example apparatus 100 having a frame 102 to allow a bag 116 to be removably attached. The apparatus 100 may be made on any suitable material and may be a modular apparatus, allowing different components to be removably attached to the frame 102. For example, the apparatus 100 may allow a bag 116 and/or the extender device 106 to be removably attached to the frame 102.

The frame 102 may be any suitable frame made of any suitable material. In some examples, the frame 102 may be extendable in any suitable manner (e.g., via a telescoping device) such that the handle 122 attached to the frame 102 may be comfortably held by a user as the user rolls the apparatus 100 along a surface.

The frame 102 may be connected to at least one frame wheel 104, which may be any suitable wheel of any suitable material. In some examples, the at least one frame wheel 104 may be a spinner wheel that may spin 360 degrees around an axis that is parallel to the frame 102, allowing the apparatus 100 to be more easily rolled by the user.

The extender device 106 may be removably attachable to the frame 102 to accommodate the addition of another bag to the modular apparatus 100, as will be described in more detail with respect to FIG. 2. The extender device 106 may include a platform 108 that may be any suitable platform upon which the bag 116 and/or an additional bag may be placed.

The extender device 106 may also include at least one platform wheel 110 connected to the platform 108. The at least one platform wheel 110 may be any suitable wheel of any suitable material. In some examples, the at least one platform wheel 110 may be a spinner wheel that may spin 360 degrees around an axis that is perpendicular to the platform 108.

The extender device 106 may also include a first extender connector device 112 and a second extender connector device 114, each of which may be any suitable connector device to connect the platform 108 to various modules of the apparatus 100, such as a mechanical connector, a magnetic connector, and the like. For example, the first extender connector device 112 and the second extender connector device 114 may each removably attach the platform 108 to the frame 102. In other examples, the first extender connector device 112 may removably attach the platform 108 to the bag 116.

The bag 116 may be any suitable bag of any suitable size. In some examples, the bag 116 may be a bag for a computing device (e.g., a laptop or tablet bag). In some examples, the bag 116 may operate as a workstation or traveling office for a computing device and may include power and/or accessories for the computing device, and/or may include other office items, via zippers and/or compartments, to support the user's non-device items or additional item needs.

The frame 102 may have at least one frame connector device 118 to removably attach the bag 116 to the frame 102. The at least one frame connector device 118 may be any suitable connector device, such as a mechanical connector, a magnetic connector, and the like.

The frame 102 may also include a bracket device 120, which may be any suitable device to removably attach another bag to the frame, as will be described in more detail with respect to FIG. 2.

Figure 2:
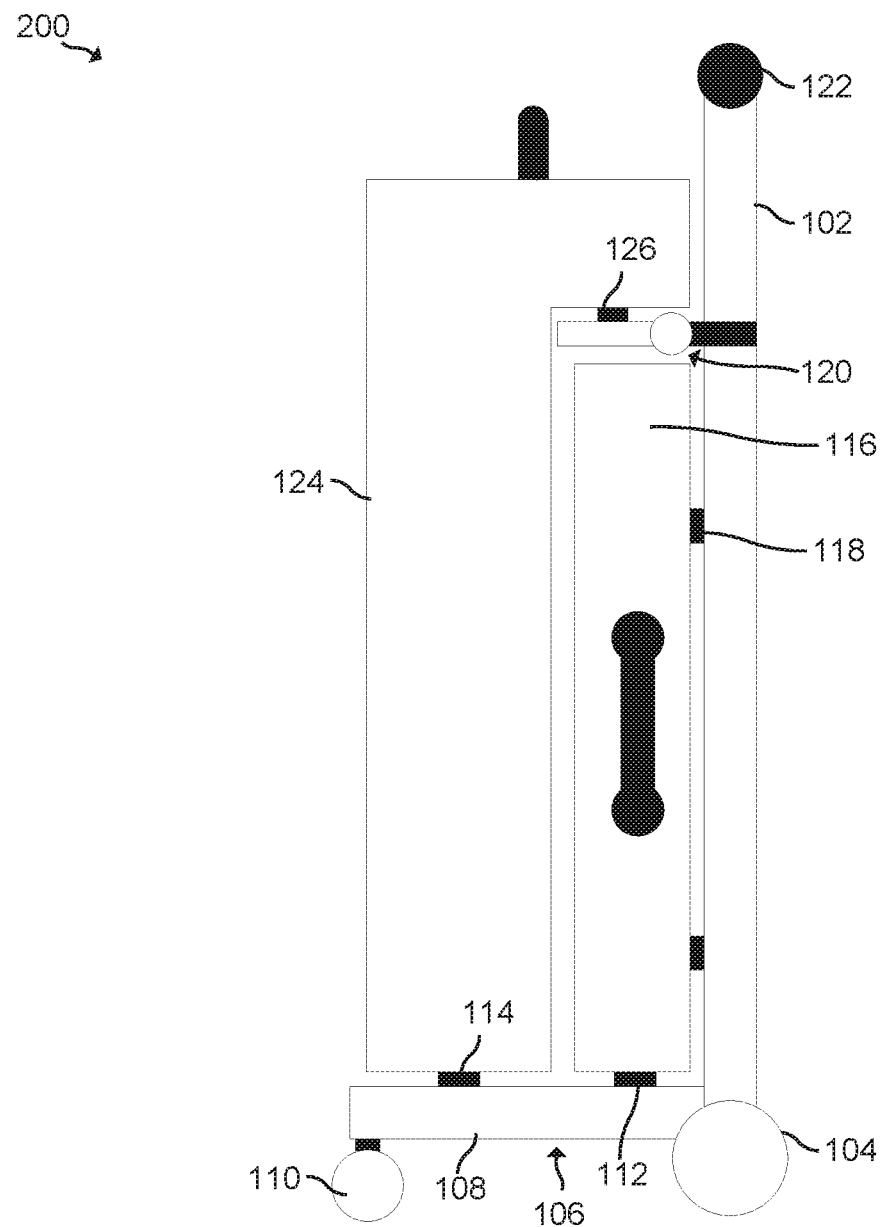
FIG. 2 illustrates an example system having a frame and bags to be removably attached to the frame.

FIG. 2 illustrates an example system 200 having a frame 102 and bags 116 and 124 to be removably attached to the frame 102. The system 200 is similar to the apparatus 100 of FIG. 1 and includes the components described for FIG. 1 with the extender device 106 attached at the bottom of the bag 116 to accommodate the bag 124. In some examples, this configuration of the extender device 106 allows the system 200 to change from a two-wheeled system (e.g., two wheels 104 attached to the frame 102) to a four-wheeled system (e.g., with the addition of two wheels 110 attached to the platform 108.

To change the configuration of components from the configuration shown in FIG. 1 to the configuration shown in FIG. 2, the extender device 106 is detached from the frame 102, and the first extender connector device 112 is attached to the bottom of the bag 116. This configuration may accommodate an additional bag, such as the bag 124, allowing the bag 116 and the bag 124 to be simultaneously attached to the frame 102. The bag 116 and the bag 124 may each be independently removable, even while the other bag is attached to the frame 102. For example, the bag 116 may be detached from the frame 102 while the bag 124 remains attached to the extender device 106 and/or the bracket device 120.

The bag 124 may be any suitable bag of any suitable size. In some examples, the bag 124 may be larger than the bag 116 to accommodate extra items, such as a user's clothing and/or personal items that the user may wish to carry. In some examples, the bag 124 may be extendable to varying sizes (e.g., via zippered compartments that may be unzipped to expand the size of the bag 124). The bag 124 may be removably attached to the second extender connector device 114 on the platform 108.

The bag 124 may also include a bag connector device 126 to removably attach the bag 124 to the bracket device 120. The bag connector device 126 may be any suitable connector device, such as a mechanical connector, a magnetic connector, and the like. The bracket device 120 may be rotatable about a pivot point on the bracket device 120 such that the bracket device 120 may be rotated to an upward configuration as shown in FIG. 1 or to an outward configuration as shown in FIG. 2. The upward configuration shown in FIG. 1 allows the bracket device 120 to be moved out of the way when the bag 124 is not attached to the system 100. The outward configuration shown in FIG. 2 allows the bag connector device 126 of the bag 124 to be removably attached to the bracket device 120.

Figure 3:
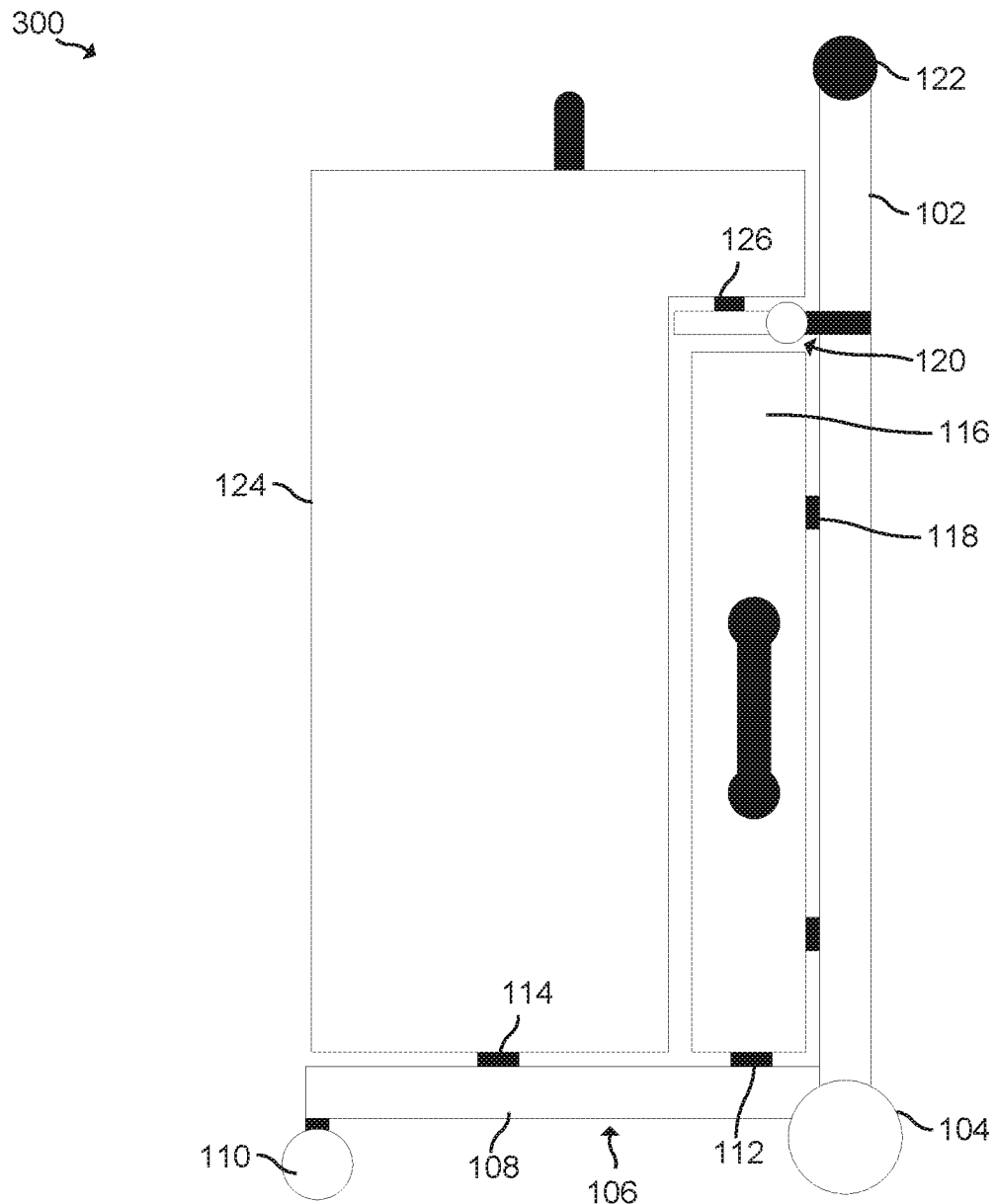
FIG. 3 illustrates an example device having a frame to allow bags of various sizes to be removably attached.

FIG. 3 illustrates an example device 300 having a frame 102 to allow bags of various sizes to be removably attached. The device 300 is similar to the system 200 of FIG. 2 and includes the components described for FIG. 2, with the bag 124 being a larger size than that shown in FIG. 2.

In some examples, the bag 124 may be the same bag as that shown in FIG. 2 but may be in an extended configuration (e.g., via expandable compartments that may be unzipped to expand the bag 124). In some examples, the bag 124 may be a different bag than that shown in FIG. 2 (e.g., the bag 124 may be a different sized module to be added to the device 300). To accommodate the larger bag 124, the platform 108 of the extender device 106 may be extendable. For example, the platform 108 may be shortened to the length shown in FIG. 2 to accommodate a smaller bag 124 and may be extended to the length shown in FIG. 3 to accommodate the larger bag 124.

What is claimed is:

1. An apparatus, comprising:
a frame;
at least one frame wheel connected to the frame;
an extender device removably attachable to the frame, the extender device comprising:
a platform,
at least one platform wheel connected to the platform, and
a first extender connector device on the platform to removably attach the platform to a first side of the frame and to removably attach the platform to a first bag of a first size attached to a second side of the frame opposite to the first side; and
a frame connector device on the frame to removably attach the first bag to the second side of the frame.

2. The apparatus of claim 1, further comprising:
a second extender connector device on the platform to removably attach the platform to a second bag of a second size, wherein the frame includes a bracket device to removably attach the second bag to the frame.

3. The apparatus of claim 2, wherein the second bag is larger than the first bag, and wherein the first bag and the second bag are simultaneously attachable to the frame.

4. The apparatus of claim 2, wherein the second bag is extendable to a larger size.

5. The apparatus of claim 1, wherein the platform is extendable.

6. The apparatus of claim 1, wherein the first extender connector device and the frame connector device are magnetic connectors.

7. The apparatus of claim 1, wherein the first bag is a laptop bag.

8. A system, comprising:
a first bag of a first size; and
a frame apparatus, comprising:
a frame;
at least one frame wheel connected to the frame;
an extender device removably attachable to the frame, the extender device comprising:
a platform,
at least one platform wheel connected to the platform, and
a first extender connector device on the platform to removably attach the platform to a first side of the frame and to removably attach the platform to the first bag attached to a second side of the frame opposite to the first side; and
a frame connector device on the frame to removably attach the first bag to the second side of the frame.

9. The system of claim 8, further comprising:
a second extender connector device on the platform to removably attach the platform to a second bag of a second size, wherein the frame includes a bracket device to removably attach the second bag to the frame.

10. The system of claim 9, wherein the second bag is larger than the first bag, and wherein the first bag and the second bag are simultaneously attachable to the frame.

11. The system of claim 9, wherein the first extender connector device and the frame connector device are magnetic connectors.

12. A device, comprising:
a frame;
at least one frame wheel connected to the frame;
an extender device removably attachable to the frame, the extender device comprising:
a platform,
at least one platform wheel connected to the platform,
a first extender connector device on the platform to removably attach the platform to a first side of the frame and to removably attach the platform to a first bag of a first size attached to a second side of the frame opposite to the first side, and
a second extender connector device on the platform to removably attach the platform to a second bag of a second size attached to a second side of the frame, wherein the frame includes a bracket device to removably attach the second bag to the second side of the frame; and
a frame connector device on the frame to removably attach the first bag to the second side of the frame.

13. The device of claim 12, wherein the second bag is larger than the first bag, and wherein the first bag and the second bag are simultaneously attachable to the frame.

14. The device of claim 12, wherein the platform is extendable.

15. The device of claim 12, wherein the first extender connector device and the frame connector device are magnetic connectors.

* * * * *